(12) United States Patent
Ogihara et al.

(10) Patent No.: US 8,968,923 B2
(45) Date of Patent: Mar. 3, 2015

(54) LITHIUM ION SECONDARY BATTERY

(75) Inventors: Wataru Ogihara, Kawasaki (JP); Atsushi Itou, Ebina (JP); Tomokazu Yamane, Kyoto (JP); Fumihiro Haga, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 168 days.

(21) Appl. No.: 13/643,207

(22) PCT Filed: Mar. 9, 2011

(86) PCT No.: PCT/JP2011/055460
§ 371 (c)(1),
(2), (4) Date: Oct. 24, 2012

(87) PCT Pub. No.: WO2011/135931
PCT Pub. Date: Nov. 3, 2011

(65) Prior Publication Data
US 2013/0065116 A1    Mar. 14, 2013

(30) Foreign Application Priority Data
Apr. 26, 2010 (JP) .................... 2010-101103

(51) Int. Cl.

| | |
|---|---|
| *H01M 6/04* | (2006.01) |
| *H01M 10/26* | (2006.01) |
| *H01M 10/0525* | (2010.01) |
| *H01M 4/134* | (2010.01) |
| *H01M 4/505* | (2010.01) |
| *H01M 4/525* | (2010.01) |
| *H01M 10/0568* | (2010.01) |

(52) U.S. Cl.
CPC .......... *H01M 10/0525* (2013.01); *H01M 4/134* (2013.01); *H01M 4/505* (2013.01); *H01M 4/525* (2013.01); *H01M 10/0568* (2013.01); *Y02E 60/122* (2013.01); *Y02T 10/7011* (2013.01)
USPC ...................................................... 429/207

(58) Field of Classification Search
None
See application file for complete search history.

(56) References Cited

FOREIGN PATENT DOCUMENTS

| | | |
|---|---|---|
| JP | 2007-287445 A | 11/2007 |
| JP | 2009-158415 A | 7/2009 |
| WO | WO 2009/084330 A1 | 7/2009 |

OTHER PUBLICATIONS

English translation of JP 2007-287445.*
Atsushi Ito et al., The Study of Reaction Mechanism of Li-rich Layered Cathode Material Showing High Discharge Capacity, Abstract of the 38$^{th}$ Battery Symposium in Japan, The Electrochemical Society of Japan, Nov. 2007, pp. 12-13.
Christopher S. Johnson et al., Anomalous Capacity and Cycling Stability of xLi$_2$MnO$_3$ (1-x)LiMO$_2$ Electrodes (M=Mn, Ni, Co) in Lithium Batteries at 50° C., Electrochemistry Communication, vol. 9, Issue 4, 2007, pp. 787-795.
Chinese Office Action, Jun. 3, 2014, 6 pages.

* cited by examiner

*Primary Examiner* — Sarah A Slifka
(74) *Attorney, Agent, or Firm* — Foley & Lardner LLP

(57) ABSTRACT

Disclosed is a lithium ion secondary battery having a positive electrode, a negative electrode and a non-aqueous electrolyte composition (electrolytic solution), characterized in that: the positive electrode includes a positive electrode active material represented by: $aLi[Li_{1/3}M1_{2/3}]O_2 \cdot (1-a)LiM2O_2$ (where M1 represents at least one kind of metal element selected from the group consisting of Mn, Ti, Zr and V; M2 represents at least one kind of metal element selected from the group consisting of Ni, Co, Mn, Al, Cr, Fe, V, Mg and Zn; and a represents a composition ratio and satisfies a relationship of $0<a<1$); the negative electrode includes a negative electrode active material containing silicon; and the non-aqueous electrolyte composition includes a lithium salt $(C_nF_{2n+1}SO_2)(C_mF_{2m+1}SO_2)NLi$ (where m and n each independently represent an integer of 2 or more as a support electrolyte. This lithium ion secondary battery attains a high capacity and good cycle characteristics.

6 Claims, No Drawings

LITHIUM ION SECONDARY BATTERY

The present application is a national stage entry of PCT Application Number PCT/JP2011/055460, filed Mar. 9, 2011, which claims priority to Japanese Patent Application Number 2010-101103, filed Apr. 26, 2010.

FIELD OF THE INVENTION

The present invention relates to a lithium ion secondary battery for use as a motor driving power source in e.g. an electric vehicle or a hybrid electric vehicle.

BACKGROUND ART

In recent years, the reduction of $CO_2$ emissions has been sincerely desired in order to address atmospheric pollution and global warming. The automotive industry has a growing expectation on the introduction of electric vehicles and hybrid electric vehicles for the reduction of $CO_2$ emissions. Under these circumstances, the development of high-performance secondary batteries as motor driving power sources of these vehicles has become an urgent necessity.

As the motor driving secondary batteries where high capacity and good cycle characteristics are required, attentions are being given to lithium ion secondary batteries having high theoretical energy.

In general, the lithium ion secondary battery includes a positive electrode and a negative electrode. The positive electrode has a positive electrode collector and a positive electrode active material and the like applied to both sides of the positive electrode collector, whereas the negative electrode has a negative electrode collector and a negative electrode active material and the like applied to both sides of the negative electrode collector. These positive and negative electrodes are connected to each other via an electrolyte layer and accommodated in a battery case.

It is considered that the selection of the positive and negative electrode active materials of the positive and negative electrodes is of extreme importance to improve the performance characteristics such as capacity characteristics and output characteristics of the lithium ion secondary battery.

There has been proposed a lithium ion secondary battery using a composite oxide represented by: $xLi[Mn_{1/2}Ni_{1/2}]O_2 \cdot yLiCoO_2 \cdot zLi[Li_{1/3}Mn_{2/3}]O_2$ (where $x+y+z=1$; $0<x<1$; $0 \leq y<0.5$; and $0<z<1$) as a positive electrode active material and a carbon material as a negative electrode active material (see Patent Document 1).

One example of composite oxide usable as the positive electrode active material is of the general formula: $aLi[Li_{1/3}M1_{2/3}]O_2 \cdot (1-a)LiM2O_2$. This composite oxide shows a high discharge capacity of 200 mAh/g and good cycle characteristics and thermal stability and is thus expected to provide good performance as the positive electrode active material.

In order for the battery as a whole to attain high capacity characteristics, it is preferable that not only the positive electrode active material but also the negative electrode active material shows a high capacity. Silicon (Si)-containing negative electrode active materials, which are much higher in capacity than carbon materials, become a focus of attention as such a high-capacity negative electrode active material.

In the case of the battery where the above composite oxide is used as the positive electrode active material in combination with the silicon-containing negative electrode active material, however, there is a problem that the kind of electrolytic solution applicable to the battery is limited due increase in discharge capacity. This is because a lithium salt contained in the electrolytic solution is decomposed by oxidation on the positive electrode side. In the case where the electrolytic solution contains lithium hexafluorophosphate ($LiPF_6$), which is most common as a support electrolyte, hydrogen fluoride (HF) is generated by hydrolysis of $LiPF_6$ and reacts with silicon of the negative electrode so that the negative electrode may deteriorate in performance.

PRIOR ART DOCUMENTS

Patent Document

Patent Document 1: Japanese Laid-Open Patent Publication No. 2007-287445

SUMMARY OF THE INVENTION

The present invention has been developed to solve the above problems in the case of using the lithium-containing composite oxide as the positive electrode active material in combination with the silicon-containing negative electrode active material. It is accordingly an object of the present invention to provide a lithium ion secondary battery capable of achieving a high capacity and good cycle characteristics (high capacity retention) even with the combined use of high-capacity positive and negative electrode active materials.

As a result of extensive researches, the present inventors have found that the above object can be achieved by the use of a lithium salt of predetermined composition as a support salt of a non-aqueous electrolytic solution. The present invention has been accomplished based on the above finding.

Namely, there is provided according to the present invention a lithium ion secondary battery, comprising: positive and negative electrodes capable of absorbing and desorbing lithium; and a non-aqueous electrolyte composition, wherein the negative electrode includes a negative electrode active material containing silicon; wherein the positive electrode includes a positive electrode active material represented by the composition formula (1): $aLi[Li_{1/3}M1_{2/3}]O_2 \cdot (1-a)LiM2O_2$ (where M1 represents at least one kind of metal element selected from the group consisting of Mn, Ti, Zr and V; M2 represents at least one kind of metal element selected from the group consisting of Ni, Co, Mn, Al, Cr, Fe, V, Mg and Zn; and a represents a composition ratio and satisfies a relationship of $0<a<1$); and where the non-aqueous electrolyte composition includes a lithium salt represented by the chemical formula (2): $(C_nF_{2n+1}SO_2)(C_mF_{2n+1}SO_2)NLi$ (where m and n each independently represent an integer of 2 or more).

The lithium ion secondary battery according to the present invention attains a high capacity and good cycle characteristics by the combined use of the specific lithium-containing composite oxide as the high-capacity positive electrode active material, the silicon-containing material as the high-capacity negative electrode active material and the specific lithium salt as the support electrolyte.

DESCRIPTION OF EMBODIMENTS

Hereinafter, the lithium ion secondary battery according to the present invention will be described in detail below. In the present invention, all percentages (%) are by mass unless otherwise specified.

First Embodiment

As mentioned above, the lithium ion secondary battery according to the present invention has positive and negative electrodes capable of absorbing and desorbing lithium and a non-aqueous electrolyte composition, wherein: the negative electrode includes a negative electrode active material containing silicon; wherein the positive electrode includes a positive electrode active material represented by the composition formula: $aLi[Li_{1/3}M1_{2/3}]O_2 \cdot (1-a)LiM2O_2$; and wherein the non-aqueous electrolyte composition includes a lithium salt represented by the chemical formula:

$$(C_nF_{2n+1}SO_2)(C_mF_{2m+1}SO_2)NLi. $$

In other words, the lithium ion secondary battery according to the present invention is characterized in that the composite oxide positive electrode and the silicon negative electrode, both of which can be charged and discharged at a high potential and show a high capacity, are used in combination with the lithium salt of the above chemical formula as a support salt of the non-aqueous electrolyte composition. (As will be explained blow, the non-aqueous electrolyte composition is a generic term for non-aqueous electrolyte materials including an electrolytic solution and a gel or solid polymer electrolyte.)

The non-aqueous electrolyte composition and the positive and negative electrodes of the lithium ion secondary battery according to the present invention will be described in more detail below.

[Non-Aqueous Electrolyte Composition]

Although a liquid non-aqueous electrolyte material called "electrolytic solution" is commonly used for a lithium ion secondary battery, it is feasible to use not only a liquid non-aqueous electrolyte material but also a polymer electrolyte material (intrinsic polymer electrolyte, gel polymer electrolyte) in the lithium ion secondary battery according to the present invention. In the present invention, the "non-aqueous electrolyte composition" is a generic term for non-aqueous electrolyte materials. There is no particular limitation on the form of the non-aqueous electrolyte composition. The non-aqueous electrolyte composition can be in liquid form, gel form or solid form.

Lithium hexafluorophosphate ($LiPF_6$) is widely used as a support electrolyte in an electrolytic solution for a lithium ion secondary battery. As indicated in the following reaction schemes (3) to (5), $LiPF_6$ is decomposed by reaction with water ($H_2O$) in the electrolytic solution.

$$Li^+ + PF_6^- \longleftrightarrow LiPF_6 \qquad (3)$$

$$LiPF_6 \longleftrightarrow LiF + PF_5 \qquad (4)$$

$$PF_5 + H_2O \longleftrightarrow 2HF + PF_3O \qquad (5)$$

The scheme (3) indicates ionic dissociation of $LiPF_6$ that occurs regardless of the presence or absence of $H_2O$. The scheme (4) indicates equilibrium of $LiPF_6$ as a complex salt. The scheme (5) indicates generation of HF by decomposition of $PF_5$ in the presence of $H_2O$. As water is generally unavoidably contained in an amount of the order of 20 ppm in the electrolytic solution, it is substantially impossible to completely limit the above reactions.

On the other hand, silicon is widely used as a negative electrode active material in a negative electrode. It is known that silicon is stabilized by formation of a thin oxide film layer ($SiO_2$) with a thickness of several urn to several tens nm at a surface thereof. As indicated in the following reaction scheme (6), this $SiO_7$ reacts with the HF generated in the reaction scheme (5).

$$SiO_2 + 4HF \rightarrow SiF_4 + 2H_2O \qquad (6)$$

The resulting $SiF_4$ is unstable and thus reacts with the $H_2O$ or HF as indicated in the following reaction schemes (7) and (8).

$$SiF_4 + 2H_2O \rightarrow SiO_2 + 4HF \qquad (7)$$

$$SiF_4 + 2HF \rightarrow H_2SiF_6 \qquad (8)$$

As mentioned above, the $SiO_2$ is removed by dissolution from the surface of the silicon active material of the negative electrode so that the silicon gets exposed and gives an easy-to-oxidize, unstable surface. This silicon surface is oxidized to $SiO_2$ by reaction with the electrolytic solution or the decomposition product of the electrolytic solution. The thus-formed $SiO_2$ is removed by reaction with the HF in the same manner as above.

Due to the fact that the silicon active material of the negative electrode is reduced through the above successive reactions, there is a problem of deterioration in the electric capacity of the secondary battery where the negative electrode active material (Si) is used in combination with the support electrolyte ($LiPF_6$).

By contrast, the lithium salt of the chemical formula: $(C_nF_{2n+1}SO_2)(C_mF_{2m+1}SO_2)NLi$, which is the support electrolyte in the present invention, is chemically stable because of its covalent bond between fluorine atoms and carbon atoms. The use of such a stable lithium salt makes it possible to prevent the generation of HF, even in the presence of $H_2O$, as compared with the use of the above-mentioned $LiPF_6$.

In the chemical formula, in and n each have to be an integer of 2 or more. One specific example of the lithium salt is $(CF_3CF_2SO_2)_2NLi$ (hereinafter sometimes referred to as "LiBETI" (lithium bis(pentafluoroethyl sufonyl)imide)).

In the lithium salt, m and n may be different values as long as each of m and n is an integer of 2 or more. If m and n exceed 5 (each take a value of 6 or more), the molecular weight of the lithium salt is so large that the ion conductivity of the lithium salt tends to be lowered. It is thus preferable that m and n are each 5 or less. The lithium salt is decomposed during use, without being able to withstand a positive electrode charge potential of 4.8 V, and thus cannot be used as the support electrolyte if m and n are less than 2 (m=n=1), that is, the lithium salt is $(CF_3SO_2)_2NLi$.

Fluorine-free inorganic lithium salts such as lithium perchlorate ($LiClO_4$) and lithium tetrachloroaluminate ($LiAlCl_4$) are also known for use as support electrolytes in lithium ion secondary batteries. However, these lithium salts have a problem in terms of stability and reactivity and cannot withstand high-potential charge/discharge operation.

In the lithium ion secondary battery according to the present invention, the electrolyte composition can be in the form of an electrolytic solution in which the lithium salt (support electrolyte) of the chemical formula (2) is contained in a non-aqueous solvent. As such a non-aqueous solvent, a high-permittivity solvent and a low-viscosity solvent are usable. These solvents can be used solely or in the form of a mixture thereof. Specific examples of the high-permittivity solvent are ethylene carbonate (EC), propylene carbonate (PC), butylene carbonate (BC) and vinylene carbonate (VC). Specific examples of the low-viscosity solvent are dimethyl carbonate (DMC), diethyl carbonate (DEC), ethyl methyl carbonate (EMC) and methyl propyl carbonate (MPC).

Further, the electrolytic solution can be used in a state of being impregnated in a separator such as a porous sheet or nonwoven fabric. The separator is disposed between the positive and negative electrodes so as to prevent internal short circuit between these electrodes. Specific examples of the separator are those formed of insulating materials that combine a high permeability with a predetermined level of mechanical strength, including nonwoven fabrics of natural or synthetic fibers such as cotton, rayon, acetate, polyamide, polyester, polyethylene (PE), polypropylene (PP), polyimide and aramid and of ceramic fibers; and porous sheets of polymers such as polyethylene, polypropylene, polyimide and aramid. The separator may be formed with a laminated structure of two kinds or more of porous sheets.

The separator may also perform the shutdown function to, when an excess current flows in the battery, close pores of the porous sheet by heat generation thereof and thereby shut down the current flow. For this function, it is preferable to use a porous sheet having a three-layer structure formed with PE/PP/PE layers of different melting points as the separator.

Alternatively, the electrolyte composition can be in the form of a polymer electrolyte material in the present invention. There is no particular limitation on the polymer electrolyte material as long as the polymer electrolyte material is of ion-conductive polymer and shows ion conductivity. In terms of mechanical strength, the polymer electrolyte material is preferably selected from those in which polymerizable ion-conductive polymers are cross-linked by thermal polymerization, ultraviolet polymerization, radiation polymerization, electron beam polymerization etc. As the polymer electrolyte material, an intrinsic polymer electrolyte and a gel polymer electrolyte are usable.

Examples of the intrinsic polymer electrolyte are polyalkylene oxide polymers such as polyethylene oxide (PEO), polypropylene oxide (PPO) and copolymers thereof. The polyalkylene oxide polymer is advantageous in that: the above lithium salt (support electrolyte) is dissolved well in the polyalkylene oxide polymer; and the polyalkylene oxide polymer shows a high mechanical strength by the formation of a cross-linking structure.

Examples of the gel polymer electrolyte are, in general, those in which the above-mentioned electrolytic solution is retained in any ion-conductive solid polymer electrolyte. In the present invention, there can also be used a gel polymer electrolyte in which the above-mentioned electrolytic solution is retained in a skeleton of a polymer with no lithium ion conductivity, such as polyvinylidene fluoride (PVdF) or polyacrylonitrile.

It is feasible to form the gel polymer electrolyte by impregnating a separator such as nonwoven fabric with a gel polymer raw material solution, and then, subjecting the gel polymer raw material solution to polymerization by the above method. The use of the separator allows an increase in the filling amount of the electrolytic solution as well as an improvement in the thermal conductivity inside the battery.

The amount of the lithium salt in the electrolyte composition is of the order of 0.5 to 1.5 mol/L, preferably of the order of 0.8 to 1.2 mol/L. The electrolyte composition may not obtain sufficient ion conductivity if the amount of the lithium salt is less than 0.5 mol/L or exceeds 1.5 mol/L.

In the present invention, the lithium salt of the chemical formula (2) (including a mixture thereof where m and n are different values) is basically used solely as the support electrolyte in the electrolyte composition but may be used in combination with any support electrolyte that does not generate HF in the electrolyte composition.

[Positive Electrode]

The positive electrode has a collector (positive electrolyte collector) and a positive electrode active material layer formed on one or both of surfaces of the collector. The collector is formed of a conductive material such as aluminum foil, copper foil, nickel foil or stainless foil. There is no particular limitation on the thickness of the collector. The collector is preferably of the order of 1 to 30 μm. The positive electrode active material layer contains a conductive additive, a binder etc. as needed in addition to the positive electrode active material.

In the present invention, the lithium-containing composite oxide of the composition formula (1): $aLi[Li_{1/3}M1_{2/3}]O_2 \cdot (1-a)LiM2O_2$ is used as the positive electrode active material. In the composition formula, M1 is at least one kind of metal element selected from the group consisting of Mn, Ti, Zr and V; M2 is at least one kind of metal element selected from the group consisting of Mi, Co, Mn, Al, Cr, Fe, V, Mg and Zn; and a is a numerical value of more than 0 and less than 1, preferably 0.5 to 0.9.

The lithium-containing composite oxide of the composition formula (1) has a high discharge capacity exceeding 200 mAh/g and shows good cycle characteristics and thermal stability as the positive electrode active material. The following problems arise if the composition ratio a falls out of the above range. If a=0, the amount of Li in the composite oxide is so small that the electric capacity of the composite oxide is insufficient. If a=1, the composite oxide cannot be charged and discharged and thus cannot be used as the positive electrode active material (the theoretical capacity of the composite oxide is 0 mAh/g).

This composite oxide can be commercially available or can be prepared by solid-phase method or solution method (mixed hydroxide method, composite carbonate method). There is no particular limitation on the particle size of the composite oxide. It is preferable that the particle size of the composite oxide is as small as possible. In terms of operation efficiency and ease of handling, the composite oxide preferably has an average particle size of the order of 1 to 30 μm, more preferably of the order of 10 to 20 μm.

The conductive additive is added to the positive electrode active material layer an as to increase the conductivity of the active material layer for improvement in battery performance. Acetylene black, carbon black, graphite and carbon fiber are usable as the conductive additive. As the hinder (binding agent), polyvinylidene difluoride (PVH), polyimide and synthetic rubber binder are usable. There is no particular limitation on the mixing ratio of the positive electrode active material, the conductive additive and the hinder in the positive electrode active material layer.

[Negative Electrode]

The negative electrode has a collector (negative electrode collector) and a negative electrode active material layer formed on one or both of surfaces of the collector as in the case of the positive electrode. The collector can be of the same conductive material as above. As in the case of the positive electrode active material layer, the negative electrode active material layer contains a conductive additive, a binder etc. as needed in addition to the negative electrode active material.

In the present invention, the active material containing silicon (Si) as its main component is used as the negative electrode active material. Examples of the silicon-containing active material are pure silicon, an alloy containing 90% or more of Si and a semiconductor silicon containing a very small amount of dopant e.g. boron or phosphorus. The negative electrode active material containing silicon as the main component shows high lithium absorbing/desorbing performance and much high capacity as compared to carbon materials and other negative electrode active materials.

In the above explanation, the positive electrode active material layer and the negative electrode active material layer are each formed on one or both of surfaces of the collector. It is alternatively feasible to form the positive electrode active material layer on one surface of the collector and the negative electrode active material layer on the other surface of the collector so that the resulting electrode can be applied to a bipolar type battery.

EXAMPLES

The present invention will be described in more detail below by way of the following examples and comparative examples. It should be however noted that the following examples are illustrative and are not intended to limit the present invention thereto.

[Performance Evaluation of Negative Electrode Half Cells]

[1] Preparation of Negative Electrode Pastes

[1-1] Negative Electrode Paste 1

A negative electrode paste 1 was prepared by mixing a silicon powder (average primary particle size: 1 μm) as a negative electrode active material, acetylene black as a conductive additive and polyimide as a binder at a mass ratio of 40:40:20 and admixing the resulting mixture with N-methylpyrrolidone as a solvent.

[1-2] Negative Electrode Paste 2

A negative electrode paste 2 was prepared in the same manner as the negative electrode paste 1, except that an alloy powder having a mass composition ratio of Si:Zn=90:10 was used in place of the silicon powder.

[1-3] Negative Electrode Paste 3

A negative electrode paste 3 was prepared in the same manner as the negative electrode paste 1, except that an alloy powder having a mass composition ratio of Si:Ti=90:10 was used in place of the silicon powder.

[2] Formation of Negative Electrodes

Negative electrodes were formed by applying the above-obtained negative electrode pastes 1 to 3 with a thickness of 70 μm to both of surfaces of copper foil collectors, and then, drying the resulting paste layers sufficiently. The thus-formed negative electrodes were dried at 80° C. in a vacuum and subjected to heat treatment at 300° C. for 30 minutes.

[3] Preparation of Electrolytic Solutions

A non-aqueous solvent was provided by mixing ethylene carbonate and diethylene carbonate at a volume ratio of 50:50. Three kinds of electrolytic solutions were prepared by dissolving each of $LiPF_6$ (lithium hexafluorophosphate), $(CF_3SO_2)_2NLi$ (abbreviation: LiTFSI) and $(CF_3CF_2SO_2)_2NLi$ (abbreviation: LiBETI) in the non-aqueous solvent at a concentration of 1M.

[4] Production of Negative Electrode Half Cells

Positive electrodes were formed by applying lithium metal to stainless discs. Each of the above-formed negative electrodes was opposed to the positive electrode. Then, polyolefin separators having a thickness of 20 μm were interposed between the respective pairs of positive and negative electrodes. The resulting laminates, in each of which the negative electrode, the separator and the positive electrode were laminated together, were placed in battery cans of stainless steel (SUS316), respectively. The battery cans were filled with the above-prepared three electrolytic solutions and sealed. With this, nine types of lithium ion secondary batteries (half cells) were produced.

[5] Cycle characteristics of Negative Electrode Half Cells

The thus-obtained lithium ion secondary batteries were tested for the discharge capacity retention by 50-cycle charge/discharge test. The test was conducted by repeating 50 charge/discharge cycles based on the assumption that one charge/discharge cycle involved, in an atmosphere of 30° C., charging the battery to 2.0V in a constant-current mode (CC, current: 0.1 C), leaving the battery for 10 minutes, discharging the battery to 0.01 V in a constant-current mode (CC, current: 0.1 C) and leaving the battery for 10 minutes.

The evaluation results are shown in TABLE 1. In TABLE 1, the discharge capacity retention refers to the ratio of the discharge capacity in the fiftieth cycle to the discharge capacity in the first cycle in the unit of percentage.

TABLE 1

| | | Support electrolyte | | Discharge capacity | | |
| --- | --- | --- | --- | --- | --- | --- |
| No. | Negative electrode active material | Composition formula | Abb. | Initial level (mAh/g) | Retention (%) | Remarks |
| 1 | Si | $LiPF_6$ | | 2000 | 60 | Compar. Ex. |
| 2 | Si90Zn10 | $LiPF_6$ | | 2000 | 70 | Compar. Ex. |
| 3 | Si90Zn10 | $LiPF_6$ | | 2000 | 80 | Compar. Ex. |
| 4 | Si | $(CF_3SO_2)_2NLi$ | LiTFSI | 2000 | 100 | Compar. Ex. |
| 5 | Si90Zn10 | $(CF_3SO_2)_2NLi$ | LiTFSI | 2000 | No data | Compar. Ex. |
| 6 | Si90Zn10 | $(CF_3SO_2)_2NLi$ | LiTFSI | 2000 | 90 | Compar. Ex. |
| 7 | Si | $(CF_3CF_2SO_2)_2NLi$ | LiBETI | 2000 | 80 | |
| 8 | Si90Zn10 | $(CF_3CF_2SO_2)_2NLi$ | LiBETI | 2000 | 90 | |
| 9 | Si90Zn10 | $(CF_3CF_2SO_2)_2NLi$ | LiBETI | 2000 | 90 | |

[Performance Evaluation of Positive Electrode Half Cells]

[1] Synthesis of Positive Electrode Active Materials

Three kinds of positive electrode active materials were synthesized by one solution method, that is, composite carbonate method. The composite carbonate method is advantageous in that: the composite carbonate method is high in yield, is performed in an aqueous solution system so as to provide a uniform composition and rs easier to control the composition than hydroxide coprecipitation method.

[1-1] Positive Electrode Active Material A

As starting materials, $NiSO_4.6H_2O$, $CoSO_4.7H_2O$ and $MnSO_4.5H_2O$ were provided. These metal sulfates were weighed at a mole ratio of Ni:Co:Mn=0.21:0.085:0.56 and mixed in high-purity water at a concentration of 2.0 mol/L. On the other hand, an aqueous $NaCO_3$ solution as a precipitant was prepared at a concentration of 2.0 mol/L; and 25% aqueous $NH_4OH$ solution as a complexing agent was diluted to a concentration of 0.2 mol/L.

The aqueous metal sulfate solution was stirred for 30 minutes by a magnetic stirrer and for 10 minutes by ultrasonic stirring. A composite carbonate of the above metal elements was precipitated out by slowly dropping the aqueous $NaCO_3$ solution and the aqueous $NH_4OH$ solution into the aqueous metal sulfate solution while maintaining the pH of the aqueous solution at 7.0 to 7.5. The thus-formed Ni/Co/Mn composite carbonate was subjected to suction filtration and washed thoroughly with high-purity water to remove Na, and then, dried for 5 hours in a drier of 120° C. A precursor of Ni/Co/Mn oxide was obtained by, after the drying, prebaking the composite carbonate for 5 hours at 500° C. in the air.

To the obtained precursor, LiOH.H$_2$O was added at a Li mole ratio of 1.16. The resulting mixture was subjected to grinding and mixing for 30 minutes by an automatic mortar. Subsequently, the mixture was molded into pellet form with 1.5 ton/cm$^2$ of pressure, baked for 12 hours at 900° C. in the air and quenched in liquid nitrogen. With this, a target composite oxide: 0.5(Li[Li$_{1/3}$Mn$_{2/3}$]O$_2$.0.5(Li[Ni$_{0.42}$Co$_{0.17}$Mn$_{0.42}$]O$_2$) was obtained. This composite oxide was adjusted to an average particle size of 5 μm and used as a positive electrode active material A.

[1-2] Positive Electrode Active Material B

A target composite oxide: 0.6(Li[Li$_{1/3}$Mn$_{2/3}$]O$_2$.0.4(Li[Ni$_{0.47}$Co$_{0.08}$Mn$_{0.47}$]O$_2$) was obtained in the same manner as above by changing the mole ratio of Ni:Co:Mn and the mole ratio of Li to the Ni/Co/Mn oxide precursor. This composite oxide was adjusted to the same average particle size as above and used as a positive electrode active material B.

[1-3] Positive Electrode Active Material C

A target composite oxide: 0.9(Li[Li$_{1/3}$Mn$_{2/3}$]O$_2$. 0.1(Li[Ni$_{0.42}$Co$_{0.17}$Mn$_{0.42}$]O$_2$) was obtained in the same manner as above by changing the mole ratio of Ni:Co:Mn and the mole ratio of Li to the Ni/Co/Mn oxide precursor. This composite oxide was adjusted to the same average particle size as above and used as a positive electrode active material G.

[2] Preparations of Positive Electrode Pastes

[2-1] Positive Electrode Paste 1

A positive electrode paste 1 was prepared by mixing the above-obtained positive electrode active material A, acetylene black as a conductive additive and polyvinylidene fluoride (PVH) at a mass ratio of 70:20:10 and admixing the resulting mixture with N-methylpyrrolidone as a solvent.

[2-2] Positive Electrode Paste 2

A positive electrode paste 2 was prepared in the same manner as the positive electrode paste 1, except that the above-obtained positive electrode active material B was used in place of the positive electrode active material A.

[2-3] Positive Electrode Paste 3

A positive electrode paste 3 was prepared in the same manner as the positive electrode paste 1, except that the above-obtained positive electrode active material C was used in place of the positive electrode active material A.

[2] Formation of Positive Electrodes

Positive electrodes were formed by applying the above-obtained positive electrode pastes 1 to 3 with a thickness of 70 μm to both of surfaces of aluminum foil collectors, and then, drying the resulting paste layers sufficiently. The thus-formed positive electrodes were dried at 80° C. in a vacuum.

[4] Production of Positive Electrode Half Cells

Negative electrodes were formed by applying lithium metal to stainless discs. Each of the above-formed positive electrodes was opposed to the positive electrode. Then, polyolefin separators having a thickness of 20 μm were interposed between the respective pairs of positive and negative electrodes. The resulting laminates, in each of which the negative electrode, the separator and the positive electrode were laminated together, were placed in battery cans of stainless steel (SUS316), respectively. On the other hand, three kinds of electrolytic solutions were prepared in the same manner as those for the negative electrode half cells. The battery cans were filled with these three electrolytic solutions and sealed. With this, nine types of lithium ion secondary batteries (half cells) were produced.

[5] Cycle Characteristics of Positive Electrode Half Cells

The thus-obtained lithium ion secondary batteries were tested for the discharge capacity retention by 10-cycle charge/discharge test. The test was conducted by repeating 10 charge/discharge cycles based on the assumption that one charge/discharge cycle involved, in an atmosphere of 30° C., charging the battery to 4.8V in a constant-current mode (CC, current: 0.1 C), leaving the battery for 10 minutes, discharging the battery to 2V in a constant-current mode (CC, current: 0.1 C) and leaving the battery for 10 minutes.

The evaluation results are shown in TABLE 2. In TABLE 2, the discharge capacity retention refers to the ratio of the discharge capacity in the tenth cycle to the discharge capacity in the first cycle in the unit of percentage: and the symbol "-" means that the charging/discharging of the battery was impossible.

TABLE 2

| | | Support electrolyte | | Discharge capacity | | |
|---|---|---|---|---|---|---|
| No. | Positive electrode active material | Composition formula | Abb. | Initial level (mAh/g) | Retention (%) | Remarks |
| 10 | A | LiPF$_6$ | | 200 | 100 | Compar. Ex. |
| 11 | B | LiPF$_6$ | | 260 | 100 | Compar. Ex. |
| 12 | C | LiPF$_6$ | | 220 | 100 | Compar. Ex. |
| 13 | A | (CF$_3$SO$_2$)$_2$NLi | LiTFSI | 200 | — | Compar. Ex. |
| 14 | B | (CF$_3$SO$_2$)$_2$NLi | LiTFSI | 260 | — | Compar. Ex. |
| 15 | C | (CF$_3$SO$_2$)$_2$NLi | LiTFSI | 220 | — | Compar. Ex. |
| 16 | A | (CF$_3$CF$_2$SO$_2$)$_2$NLi | LiBETI | 200 | 100 | |
| 17 | B | (CF$_3$CF$_2$SO$_2$)$_2$NLi | LiBETI | 260 | 95 | |
| 18 | C | (CF$_3$CF$_2$SO$_2$)$_2$NLi | LiBETI | 220 | 100 | |

Positive electrode active material
A: 0.5(Li[Li$_{1/3}$Mn$_{2/3}$]O$_2$)•0.5(Li[Ni$_{0.42}$Co$_{0.17}$Mn$_{0.42}$]O$_2$)
B: 0.6(Li[Li$_{1/3}$Mn$_{2/3}$]O$_2$)•0.4(Li[Ni$_{0.47}$Co$_{0.08}$Mn$_{0.47}$]O$_2$)
C: 0.9(Li[Li$_{1/3}$Mn$_{2/3}$]O$_2$)•0.1(Li[Ni$_{0.42}$Co$_{0.17}$Mn$_{0.42}$]O$_2$)

It has been shown in TABLES 1 and 2 that: among the above three kinds of lithium salt support electrolytes, LiPF$_6$ and LiBETI are applicable to the positive electrode in which the composite oxide of the composition formula (1) is contained as the active material; and there is almost no difference in performance between LiPF$_6$ and LiBETI with respect to the kind (composition) of the composite oxide positive electrode.

[Performance Evaluation of Full Cells]

[1] Production of Full Cells

Positive electrodes were formed by applying the above positive electrode pastes 1 to 3 in which the positive electrode active materials A to C were contained, respectively, to collectors. Negative electrodes were formed by applying the above negative electrode pastes 1 to 3 in which the silicon and silicon-containing alloy were contained, respectively, to collectors. The positive electrodes were opposed to the negative electrodes, respectively. The same separators as above were interposed between the respective pairs of positive and negative electrodes. The resulting laminates, in each of which the negative electrode, the separator and the positive electrode were laminated together, were respectively placed in the same stainless steel battery cans as above. The battery cans were filled with the above-prepared three electrolytic solutions and sealed. With this, nine types of lithium ion secondary batteries (eight types of comparative examples and five types of examples) were produced in total.

[2] Cycle Characteristics of Full Cells

The thus-obtained lithium ion secondary batteries were tested for the discharge capacity retention by the same 10-cycle charge/discharge test as in the positive electrode half cells. Namely, the test was conducted by repeating 10 charge/discharge cycles based on the assumption that one charge/discharge cycle involved, in an atmosphere of 30° C., charging the battery to 4.8V in a constant-current mode (CC, current: 0.1 C), leaving the battery for 10 minutes, discharging the battery to 2V in a constant-current mode (CC, current: 0.1 C) and leaving the battery for 10 minutes.

The evaluation results are shown in TABLE 3. In TABLE 3, the discharge capacity retention refers to the ratio of the discharge capacity in the tenth cycle to the discharge capacity in the first cycle in the unit of percentage; and the symbol "-" means that the charging/discharging of the battery was impossible as in the case of TABLE 2.

charge retention of the battery with the use of $(CF_3CF_2SO_2)_2NLi$ in place of $LiPF_6$ or $(CF_3SO_2)_2NLi$.

The same tendency was confirmed with regard to the kind of lithium salt by comparison of Comparative Examples 2 and 5 and Example 2 in which the positive electrode containing the active material B and the negative electrode containing the Si-10% Zn active material were used in combination.

The same tendency was also confirmed by comparison of Comparative Examples 3 and 6 and Example 3 in which the positive electrode containing the active material B and the negative electrode containing the Si-10% Ti active material were used in combination.

It was further confirmed, by comparison of Comparison 7 and Example 1 in which the positive electrode containing the active material. A was used in combination with the negative electrode containing the pure silicon active material and by comparison of Comparative Example 8 and Example 5 in which the positive electrode containing the active material C was used in combination with the negative electrode containing the pure silicon active material, that it is possible to achieve a higher discharge capacity retention with the use of $(CF_3CF_2SO_2)_2NLi$ than with the use of $LiPF_6$.

It has been shown, by comparison of Examples 1, 4 and 5 in which $(CF_3CF_2SO_2)_2NLi$ was contained in the electrolytic solution and Comparative Examples 1, 7 and 8 in which $LiPF_6$ was contained in the electrolytic solution, that the discharge capacity retention of the battery is hardly influenced by the kind of the positive electrode active material in the case of using the positive electrode containing the pure silicon as the active material.

TABLE 3

| Sample type | Positive electrode active material | Negative Electrode active material | Support electrolyte | Discharge capacity Initial level (mAh/g) | Retention (%) |
|---|---|---|---|---|---|
| Comparative Example 1 | B | Si | $LiPF_6$ | 260 | 80 |
| Comparative Example 2 | B | Si90Zn10 | $LiPF_6$ | 260 | 80 |
| Comparative Example 3 | B | Si90Ti10 | $LiPF_6$ | 260 | 80 |
| Comparative Example 4 | B | Si | $(CF_3SO_2)_2NLi$ | 260 | — |
| Comparative Example 5 | B | Si90Zn10 | $(CF_3SO_2)_2NLi$ | 260 | No data |
| Comparative Example 6 | B | Si90Ti10 | $(CF_3SO_2)_2NLi$ | 260 | — |
| Comparative Example 7 | A | Si | $LiPF_6$ | 200 | 85 |
| Comparative Example 8 | C | Si | $LiPF_6$ | 220 | 80 |
| Example 1 | A | Si | $(CF_3CF_2SO_2)_2NLi$ | 200 | 85 |
| Example 2 | B | Si90Zn10 | $(CF_3CF_2SO_2)_2NLi$ | 260 | 85 |
| Example 3 | B | Si90Ti10 | $(CF_3CF_2SO_2)_2NLi$ | 260 | 90 |
| Example 4 | B | Si | $(CF_3CF_2SO_2)_2NLi$ | 260 | 90 |
| Example 5 | C | Si | $(CF_3CF_2SO_2)_2NLi$ | 220 | 90 |

Positive electrode active material
A: $0.5(Li[Li_{1/3}Mn_{2/3}]O_2) \cdot 0.5(Li[Ni_{0.42}Co_{0.17}Mn_{0.42}]O_2)$
B: $0.6(Li[Li_{1/3}Mn_{2/3}]O_2) \cdot 0.4(Li[Ni_{0.47}Co_{0.08}Mn_{0.47}]O_2)$
C: $0.9(Li[Li_{1/3}Mn_{2/3}]O_2) \cdot 0.1(Li[Ni_{0.42}Co_{0.17}Mn_{0.42}]O_2)$ It was confirmed, by comparison of Comparative Examples 1 and 4 and Example 4 in which the positive electrode containing the active material B and the negative electrode containing the pure silicon active material were used in combination with the different kinds of lithium salts as the support electrolytes, that it is possible to improve the dis- By comparison of Comparative Examples 1, 7 and 8 and Examples 1, 4 and 5 with attention given to the influence of the positive electrode active material on the initial discharge capacity, it was found that the positive electrode active material A (composition ratio a=0.5) and the positive electrode active material C (composition ratio a=0.9) had the tendency to lower the initial discharge capacity as compared to the positive electrode active material B (composition ratio a=0.6). Namely, it is expected that the initial discharge capacity would be lowered if the composition ratio a is less than 0.5 or exceeds 0.9. It can be thus said that the composition ratio a is preferably in the range of at least 0.5 to 0.9.

The invention claimed is:

1. A lithium ion secondary battery, comprising:
    positive and negative electrodes capable of absorbing and desorbing lithium; and
    a non-aqueous electrolyte composition,
        wherein the negative electrode includes a negative electrode active material containing silicon as a main component;
        wherein the positive electrode includes a positive electrode active material represented by the following composition formula (1); and
        wherein the non-aqueous electrolyte composition includes a lithium salt represented by the following chemical formula (2), $$a\text{Li}[\text{Li}_{1/3}\text{M1}_{2/3}]\text{O}_2 \cdot (1-a)\text{LiM2O}_2 \quad (1)$$

where M1 represents at least one kind of metal element selected from the group consisting of Mn, Ti, Zr and V; M2 represents at least one kind of metal element selected from the group consisting of Ni, Co, Mn, Al, Cr, Fe, V, Mg and Zn; and a represents a composition ratio and satisfies a relationship $0.5 \leq a \leq 0.9$, $$(\text{C}_n\text{F}_{2n+1}\text{SO}_2)(\text{C}_m\text{F}_{2m+1}\text{SO}_2)\text{NLi} \quad (2)$$

where m and n each independently represent an integer of 2 or more.

2. The lithium ion secondary battery according to claim 1, wherein m and n are 5 or less in the chemical formula (2).

3. The lithium ion secondary battery according to claim 2 wherein the non-aqueous electrolyte composition is $(\text{CF}_3\text{CF}_2\text{SO}_2)_2\text{NLi}$.

4. The lithium ion secondary battery according to claim 1, wherein the negative electrode active material is either a pure silicon active material or a Si—Ti active material.

5. The lithium ion secondary battery according to claim 1, wherein the charge potential of the lithium ion secondary battery is 4.8 V.

6. The lithium ion secondary battery according to claim 1, wherein the positive electrode active material consists essentially of the positive electrode active material represented by the composition formula (1).

* * * * *